United States Patent
Tsuruya

(10) Patent No.: US 7,405,951 B2
(45) Date of Patent: Jul. 29, 2008

(54) SWITCHING POWER SUPPLY DEVICE

(75) Inventor: Mamoru Tsuruya, Saitama (JP)

(73) Assignee: Sanken Electric Co., Ltd. (JP)

( * ) Notice: Subject to any disclaimer, the term of this patent is extended or adjusted under 35 U.S.C. 154(b) by 198 days.

(21) Appl. No.: 10/534,795

(22) PCT Filed: Jun. 14, 2004

(86) PCT No.: PCT/JP2004/008323

§ 371 (c)(1),
(2), (4) Date: May 12, 2005

(87) PCT Pub. No.: WO2005/015725

PCT Pub. Date: Feb. 17, 2005

(65) Prior Publication Data
US 2006/0018134 A1    Jan. 26, 2006

(30) Foreign Application Priority Data
Aug. 11, 2003   (JP) .............................. 2003-291594

(51) Int. Cl.
H02M 3/335 (2006.01)

(52) U.S. Cl. .................... 363/21.04; 336/160; 336/165; 336/212; 323/250; 323/307; 323/331

(58) Field of Classification Search .............. 363/21.04, 363/21.03, 15, 13; 336/131, 155, 160, 165, 336/170, 173, 178, 180, 182, 184, 188, 189, 336/212, 220, 221; 327/103, 374, 375, 376, 327/377, 365; 361/35, 38, 268, 269, 270; 307/7, 28, 60, 83, 416, 417, 418, 112, 113, 307/125, 126; 323/250, 253, 307, 308, 331, 323/334, 335

See application file for complete search history.

(56) References Cited

U.S. PATENT DOCUMENTS 2,608,610 A  *  8/1952  Thulin ....................... 336/84 R
2,949,591 A  *  8/1960  Craige .......................... 336/83
3,173,119 A  *  3/1965  Thompson .................. 336/133

(Continued)

FOREIGN PATENT DOCUMENTS

JP         53-024530         3/1978

(Continued)

Primary Examiner—Jeffrey L. Sterrett
Assistant Examiner—Stuart Hansen
(74) Attorney, Agent, or Firm—Kilpatrick Stockton LLP

(57) ABSTRACT

A switching power supply includes: a first series circuit, connected to both terminals of a direct current power supply Vdc1, in which a primary winding 5a of a transformer T, a reactor L3 and a first switch Q1 are connected in series; a second series circuit, connected to both terminals of the primary winding 5a and the reactor L3, which includes a switch Q2 and a capacitor C3; a smoothing circuit D1, D2, L1, C4; and a control circuit 10 alternately turning on and turning off the switches Q1, Q2. The transformer T includes: a main core 21, formed with a magnetic circuit, on which the primary and secondary windings 5a, 5b are wound with a given gap 23; and a plurality of auxiliary cores 24a, 24b disposed in the given gap 23 with a given distance in a circumferential direction of the primary winding 5a. Further, the reactor L3 is formed of a leakage inductance of the transformer T.

12 Claims, 9 Drawing Sheets

U.S. PATENT DOCUMENTS

| | | | | |
|---|---|---|---|---|
| RE31,840 E | * | 2/1985 | Harris et al. | 363/97 |
| 4,549,130 A | | 10/1985 | Dobberstein | 323/308 |
| 4,613,841 A | * | 9/1986 | Roberts | 336/83 |
| 4,959,764 A | * | 9/1990 | Bassett | 363/16 |
| 5,126,931 A | * | 6/1992 | Jitaru | 363/21.04 |
| 5,764,494 A | * | 6/1998 | Schutten et al. | 363/17 |
| 5,770,982 A | | 6/1998 | Moore | 333/32 |
| 5,789,907 A | * | 8/1998 | Casagrande | 323/335 |
| 6,600,402 B1 | * | 7/2003 | LaFleur et al. | 336/61 |
| 6,831,545 B2 | * | 12/2004 | Karbula | 336/212 |
| 6,980,077 B1 | * | 12/2005 | Chandrasekaran et al. | 336/212 |
| 2002/0097130 A1 | * | 7/2002 | Vinciarelli et al. | 336/212 |
| 2002/0190831 A1 | * | 12/2002 | Hess et al. | 336/174 |
| 2003/0122646 A1 | * | 7/2003 | Park | 336/182 |
| 2004/0239470 A1 | * | 12/2004 | Lu | 336/212 |
| 2005/0140482 A1 | * | 6/2005 | Cheng et al. | 336/180 |

FOREIGN PATENT DOCUMENTS

| | | | |
|---|---|---|---|
| JP | 55-169809 | | 12/1980 |
| JP | 60-037111 A | | 2/1985 |
| JP | 62011211 A | * | 1/1987 |
| JP | 03-250703 | | 11/1991 |
| JP | 04-030408 | | 2/1992 |
| JP | 05-004434 | | 1/1993 |
| JP | 10-223458 | | 8/1998 |
| JP | 11-098831 A | | 4/1999 |
| JP | 11-186076 A | | 7/1999 |
| JP | 2000-306744 | | 11/2000 |
| JP | 2000-306745 | | 11/2000 |
| JP | 2000-340441 A | | 12/2000 |
| JP | 2000340441 A | * | 12/2000 |
| JP | 2001-230133 A | | 8/2001 |
| JP | 2002-075750 | | 3/2002 |
| JP | 2002-199719 A | | 7/2002 |
| WO | WO 04/036726 | | 4/2004 |

* cited by examiner

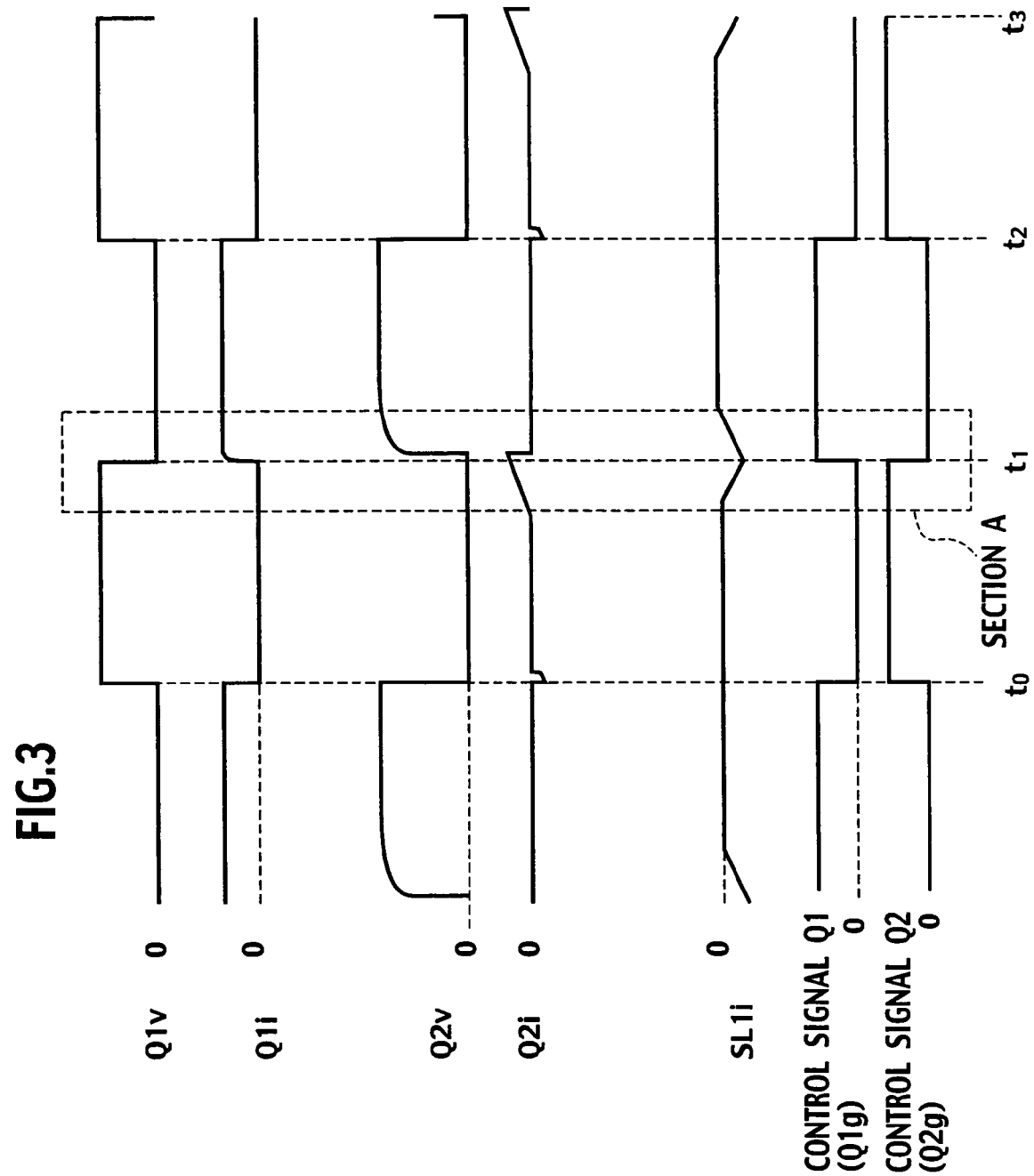

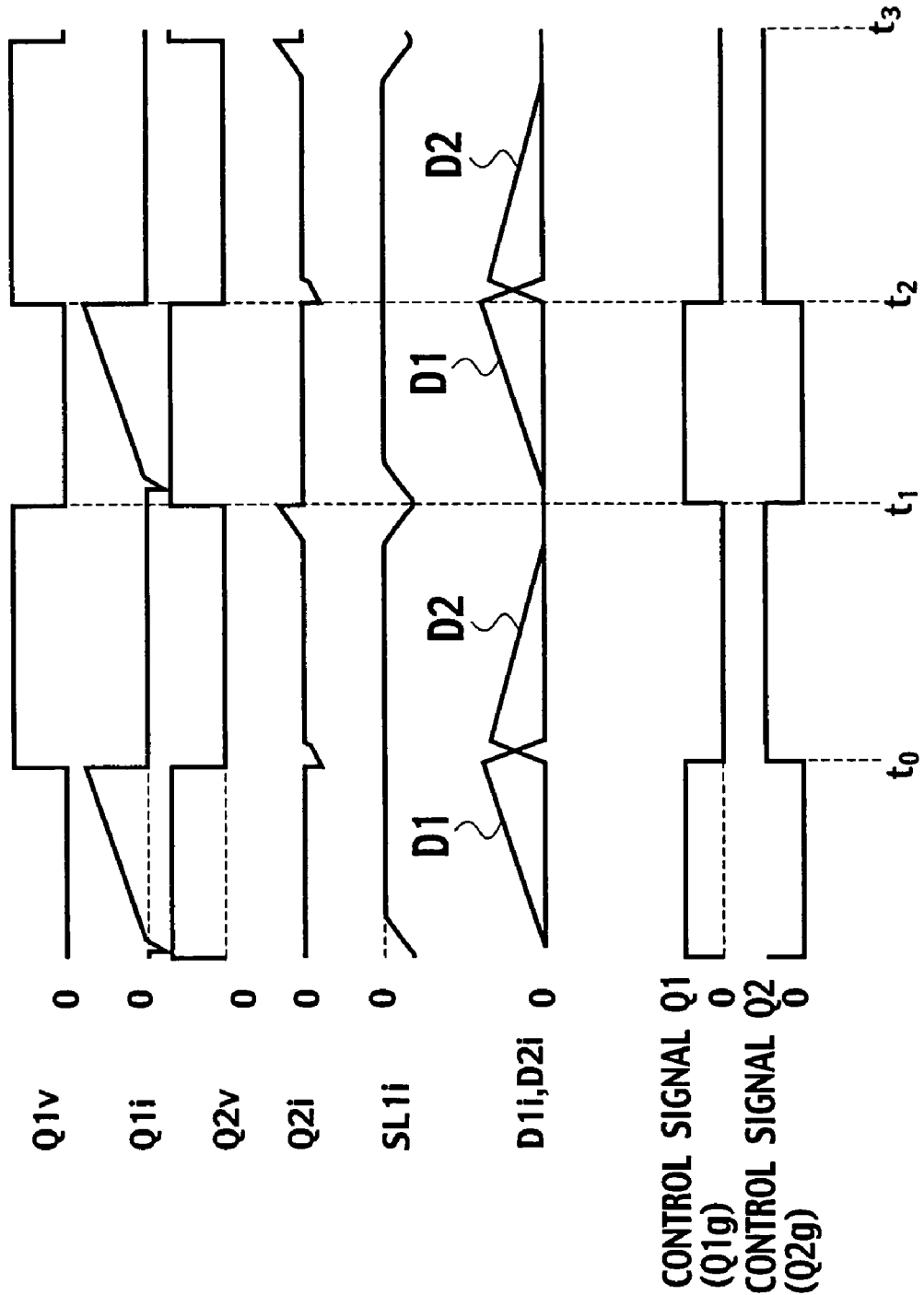

SWITCHING POWER SUPPLY DEVICE

TECHNICAL FIELD

The present invention relates to a switching power supply with high efficiency, small size, and low noises.

BACKGROUND ART

A switching power supply turns on or turns off a switch to control a current flowing through a primary winding of a transformer, and rectifies and smoothes a voltage developed across a secondary winding of the transformer, to supply the resulting current output to a load. Since the transformer used in such a switching power supply serves to transfer energy, a structure and a characteristic of the transformer play important roles.

FIG. 1 is a view showing a structure of one example of a magnetic leakage transformer disclosed in Japanese Patent Application Laid-open No. 2000-340441. The magnetic leakage transformer 111 shown in FIG. 1 is comprised of an E-core 113, formed with a magnetic circuit, which is made of magnetic material, an I-core 115 that forms a main iron core together with the E-core 113, a primary winding 119 and a secondary winding 125 mounted to the E-core 113 at suitable locations, a cylindrical magnetic leakage iron core 123, made of magnetic material, which is located in a position through which magnetic fluxes leaked from the magnetic circuit pass, and a current detection winding 121 mounted onto the magnetic leakage iron core 123 for detecting leakage magnetic fluxes.

In the magnetic leakage transformer 111, since the magnetic leakage iron core 123 made of magnetic material is located in a position through which magnetic fluxes leaked from the magnetic circuit pass and the current detection winding 121 is mounted onto the magnetic leakage iron core 123 for detecting the leakage magnetic fluxes, the current can be detected without causing power loss and complexity in structure.

DISCLOSURE OF THE INVENTION

In the meanwhile, research and development work has been progressively undertaken in recent days to provide a switching power supply wherein a reactor is connected to a primary winding of a transformer in series to allow a switch to execute switching operations through the use of energy stored in the reactor for thereby minimizing switching losses. In such a structure, in order to further eliminate the switching losses, the reactor needs to have a well-suited inductance value.

However, since the magnetic leakage transformer 111 merely has a fixed leakage inductance, the inductance of the reactor have been appropriately adjusted by connecting an external reactor to the primary winding 119 in series. This results in an increase in the number of component parts, an increase in costs, an increase in a packaging surface area and an increase in size of the switching power supply.

It is, therefore, an object of the present invention to provide a switching power supply wherein a transformer has a well-suited leakage inductance value with no external reactor while making it possible to achieve zero-voltage switching for thereby providing high efficiency and a minimized structure at low noises.

The present invention has been completed with a view to addressing the above issues. A first aspect of the present invention provides a switching power supply comprising a first series circuit, connected to both terminals of a direct current power supply, in which a primary winding of a transformer, a reactor and a first switch are connected in series, a second series circuit, connected to both terminals of the first switch or both terminals of the primary winding and the reactor, in which a second switch and a capacitor are connected in series, a smoothing circuit smoothing a voltage developed across a secondary winding of the transformer, and a control circuit alternately turning on and turning off the first and second switches, wherein the transformer includes a main core, formed with a magnetic circuit, on which the primary and secondary windings are wound with a given gap, and a plurality of auxiliary cores disposed in the given gap with a given distance in a circumferential direction of the primary winding, and wherein the reactor is formed of a leakage inductance of the transformer.

A second aspect of the present invention provides a switching power supply comprising a first series circuit, connected to both terminals of a direct current power supply, in which a primary winding of a transformer, a reactor and a first switch are connected in series, a second series circuit, connected to both terminals of the first switch or both terminals of the primary winding and the reactor, in which a second switch and a capacitor are connected in series, a smoothing circuit smoothing a voltage developed across a secondary winding of the transformer, a control circuit alternately turning on and turning off the first and second switches, and a feedback winding located on a secondary side of the transformer to allow energy stored in the reactor, when the first switch is turned on, to be circulated to a secondary side when the first switch is turned off, wherein the transformer, formed with a magnetic circuit, including: a main core that has a central leg on which the primary winding of the transformer and the feedback winding are wound with a given gap, and a side core on which the secondary winding of the transformer is wound, and a plurality of auxiliary cores disposed in the given gap with a given distance in a circumferential direction of the primary winding, and wherein the reactor is formed of a leakage inductance of the transformer.

BRIEF DESCRIPTION OF DRAWINGS

FIG. 3 is a timing chart for signals at various parts of the switching power supply of the first embodiment.

FIG. 4 is a timing chart illustrating details of signals appearing at various parts of the switching power supply of the first embodiment when a switch Q1 is turned on.

FIG. 13 is a timing chart for signals at various parts of the switching power supply of the second embodiment.

BEST MODE FOR CARRYING OUT THE INVENTION

Hereinafter, switching power supplies of various embodiments according to the present invention are described below in detail with reference to the accompanying drawings.

EMBODIMENT 1

A switching power supply of a first embodiment features that when a main switch is turned on, electric power is directly supplied to a load via a secondary winding of a transformer while when the main switch is turned off, excitation energy stored in a primary winding of the transformer is stored in a capacitor C3 to turn on an auxiliary switch whereby first and third quadrants on a B-H curve of a core of the transformer is used and making up shortfalls in the excitation energy with energy from a reactor L3 allows a starting point on the B-H curve to rest on a lower end of the third quadrant whereas a saturable reactor is connected to the primary winding of the transformer in parallel whereby the saturable reactor is saturated at a terminating point of an on-period of the auxiliary switch to increase a current to cause a reverse voltage to sharply occur when the auxiliary switch is turned off for thereby permitting the main switch to achieve zero-voltage switching.

Figure 1:
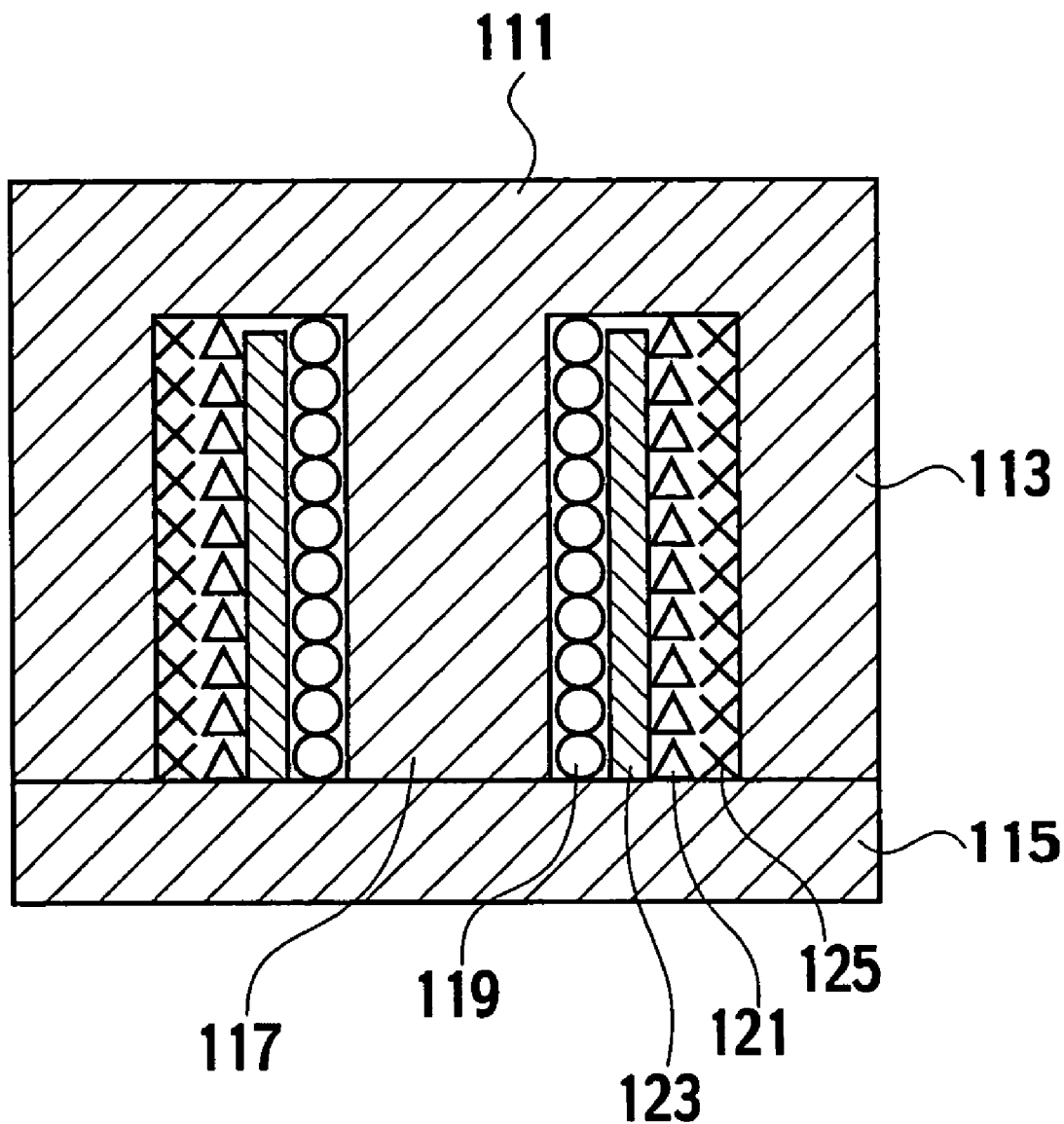
FIG. 1 is a view illustrating a structure of one example of a related art magnetic leakage transformer.
Figure 2A:
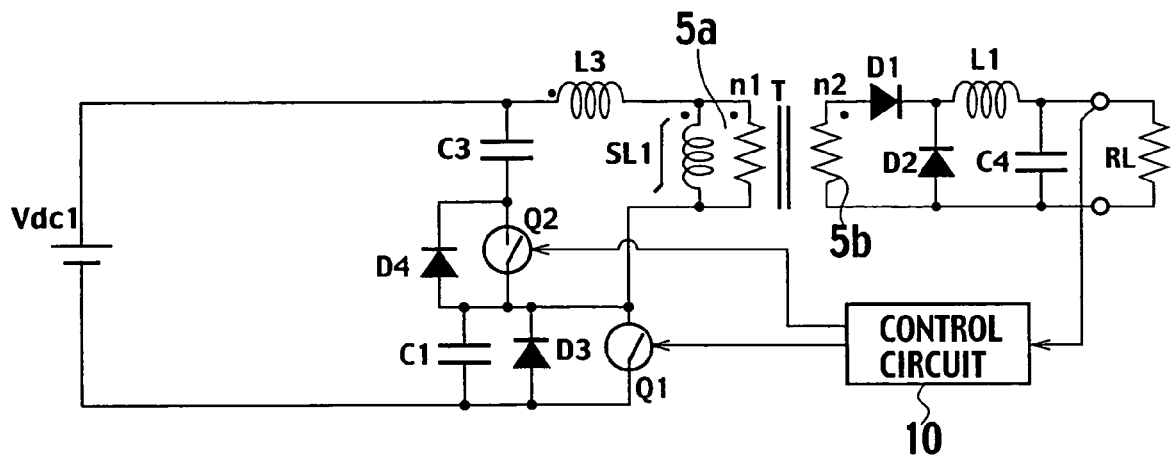
FIG. 2 is a circuit structural view showing a switching power supply of a first embodiment.
Figure 2B:
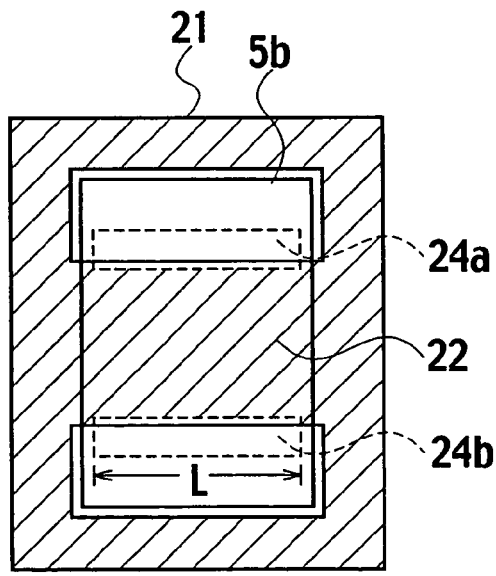
Figure 2C:
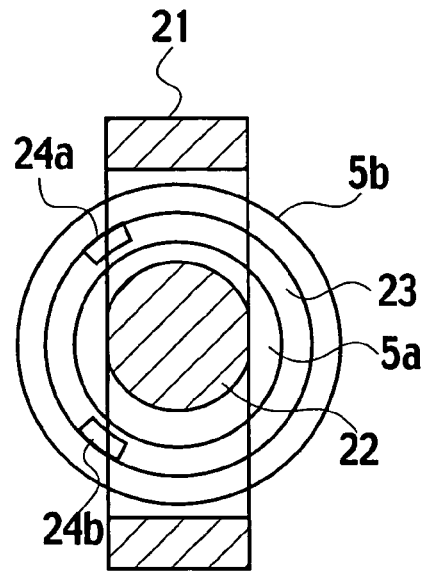

FIGS. 2A, 2B and 2C are circuit structural views of the switching power supply of the first embodiment. In FIG. 2A, connected across both terminals of a direct current power supply Vdc1 is a series circuit that is composed of a reactor L3, a primary winding 5a (with the winging number n1) and a switch Q1 (main switch) such as a MOSFET. Connected across both terminals of the switch Q1 are a diode D3 and a resonant capacitor C1 in parallel.

The diode D3 may include a parasitic capacitor of the switch Q1 and the resonant capacitor C1 may include a parasitic capacitor of the switch Q1.

Connected to a junction between one end of the primary winding 5a of the transformer T and one end of the switch Q1 is one end of a switch Q2 (auxiliary switch) composed of a MOSFET. Further, other end of the switch Q2 is connected to a positive electrode of the direct current power supply Vdc1 and one end of the reactor L3 via a capacitor C3. Also, the other end of the switch Q2 may be connected to a negative electrode of the direct current power supply Vdc1 via the capacitor C3.

The reactor L3 forms an electric power supply source that stores electric power when the switch Q1 is turned on and supplies stored electric power to the capacitor C3 when the switch Q1 is turned off.

Connected across the both terminals of the switch Q2 in parallel thereto is a diode D4. The diode D4 may include a parasitic diode of the switch Q2. The switches Q1, Q2 have a duration (dead time period) in which both switches Q1, Q2 are turned off and are alternately turned on or turned off by PWM controls performed by a control circuit 10.

Connected across the both terminals of the primary winding 5a of the transformer T is a saturable reactor SL1. The saturable reactor SL1 utilizes a saturating characteristic of a core of the transformer T. Since a large alternating current with equal amplitude flows through the saturable reactor SL1, magnetic fluxes equally vary between first and second quadrants in terms of a zero point on a B-H curve shown in FIG. 5.

Figure 5:
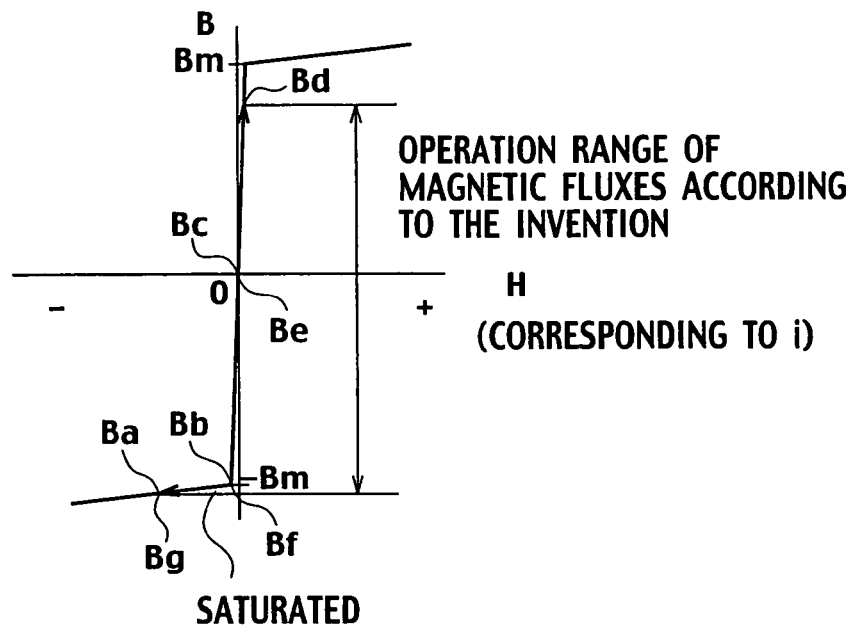
FIG. 5 is a view illustrating a B-H characteristic of a transformer incorporated in the switching power supply of the first embodiment

As shown in FIG. 5, further, magnetic fluxes B (more properly, the symbol B represents a magnetic density and a true magnetic fluxes φ are described as φ=B·S where S represents a cross-section area of a core. In this case, S=1 and φ=B are supposed) saturate at Bm in terms of a certain positive magnetic field H and saturate at -Bm in terms of a certain negative magnetic field H. The magnetic field H is generated in proportion to the magnitude of a current i. With the saturable reactor SL1, the magnetic fluxes B shift in a path: Ba→Bb→Bc→Bd→Be→Bf→Bg on the B-H curve and the magnetic fluxes have a wide operating range. States between Ba and -Bb, Bf and Bg on the B-H curve represent saturated states, respectively.

Wound on a core of the transformer T are the primary winding 5a and a secondary winding 5b (with the winding number n2) having the same phase to the primary winding 5a. Further, one end of the secondary winding 5b is connected to a diode D1 while a junction between the diode D1 and one end of a reactor L1 and the other end of the secondary winding 5b are connected to a diode D2. Furthermore, the diodes D1 and D2 form a rectifying circuit. The other end of the reactor L1 and the other end of the secondary winding 5b are connected to a capacitor C4. The capacitor C4 smoothes a voltage of the reactor L1 to output a direct current output to a load LR.

Also, the transformer T forms a structure as shown in a font cross-sectional view in FIG. 2B and in a side cross-sectional view in FIG. 2C, whose detail is described below.

The control circuit 10 alternately and controllably turns on or turns off the switches Q1 and Q2 and controls in a way to decrease an on-duration of a pulse applied to the switch Q1 while increasing an on-duration of a pulse applied to the switch Q2 when an output voltage of the load RL exceeds a reference voltage. That is, a decrease of the on-duration of the pulse of the switch Q1 when the output voltage of the load RL exceeds the reference voltage allows the output voltage to be controlled at a fixed voltage.

Further, the control circuit 10 turns off the switch Q2 at time when a current Q2$i$ of the switch Q2 increases and, thereafter, turns on the switch Q1. When turning on the switch Q1, the control circuit 10 turns on the switch Q1 during a given period wherein the voltage of the switch Q1 becomes zero voltage due to a resonance between the resonance capacitor C1 connected to the switch Q1 in parallel thereto and a saturated inductance of the saturable reactor SL1.

Figure 4:
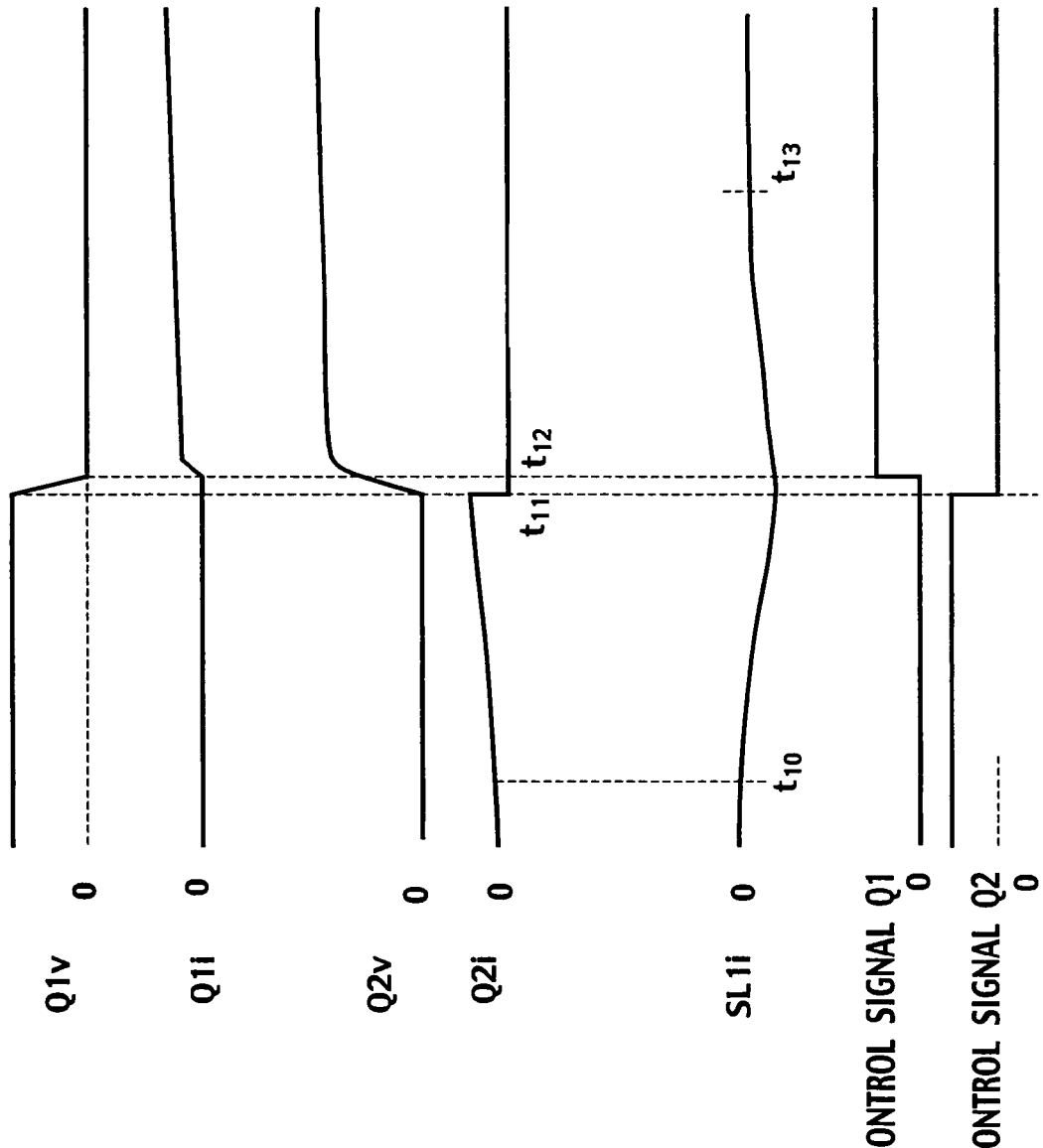
Figure 6:
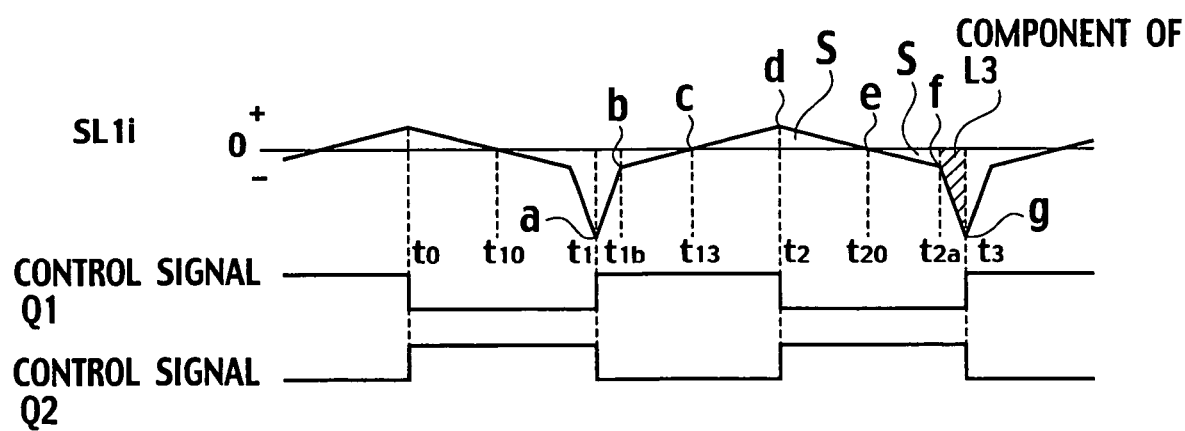
FIG. 6 is a timing chart of a current flowing through a saturable reactor incorporated in the switching power supply of the first embodiment

Next, a basic sequence of operations of the switching power supply of the first embodiment mentioned above is described with reference to timing charts shown in FIGS. 3, 4 and 6. FIG. 3 is the timing chart for signals at various parts of the switching power supply of the first embodiment. FIG. 4 is the timing chart illustrating details of signals at various parts of the switching power supply of the first embodiment when the switch Q1 is turned on. FIG. 5 is a view showing a B-H characteristic of a transformer incorporated in the switching power supply of the first embodiment. FIG. 6 is the timing chart of a current of a saturable reactor incorporated in the switching power supply of the first embodiment.

Also, FIGS. 3 ad 4 show a voltage Q1$v$ developed at the both terminals of the switch Q1, a current Q1$i$ flowing through the switch Q1, a voltage Q2$v$ developed at the both terminals of the switch Q2, a current Q2$i$ flowing through the switch Q2, and a current SL1$i$ flowing through the saturable reactor SL1.

First, if the switch Q1 is turned on at time t1 (corresponding to time t11 to t12), a current flows in a path: Vdc1→L3→5a (SL1)→Q1→Vdc1. Then, energy is stored in the reactor L3.

Also, at this time, a voltage is developed across the second winding 5b of the transformer T to cause a current to flow in a path: 5b→D1→L1→C4→5b. Moreover, a current SL1i also flows through the saturable reactor SL1 when the switch Q1 is turned on, and then energy is stored in the saturable reactor SL1.

As shown in FIG. 6, the current SL1i varies on a current value a (negative value) at time t1, a current value b (negative value) at time t1b, a current value c (zero current) at time t13, and a current value d (positive value) at time t2, in turn. On the B-H characteristic curve shown in FIG. 5, the magnetic fluxes vary in a sequence: Ba→Bb→Bc→Bd. Also, the symbols Ba to Bg shown in FIG. 5 correspond to the symbols a to g in FIG. 6.

Next, if the switch Q1 is turned off at time t2, energy stored in the saturable reactor SL1 is charged to the capacitor C1. Then, a voltage resonance occurs between an inductance of the saturable reactor SL1 and the capacitor C1, thereby raising the voltage Q1v of the switch Q1. Also, a current flows in a path: L1→C4→D2→L1, thereby supplying a current to the load RL via the capacitor C4.

Then, when a voltage of the capacitor C1 equals that of the capacitor C3, the saturable reactor SL1 releases energy to render the diode D4 conductive to allow the flow of diode current, thereby charging the capacitor C3. Moreover, the switch Q2 is turned on and then the switch Q2 falls in a zero-voltage switch. Also, the current SL1i varies from a current value d (positive value) at time t2 to a current e (zero) at time t20. On the B-H characteristic curve shown in FIG. 5, the magnetic fluxes vary from Bd to Be.

Further, while the saturable reactor SL1 releases energy, energy is released from the reactor L3 in a path: L3→5a(SL1)→D4→C3→L3, thereby charging the capacitor C3. That is, energy from the reactor L3 is added to energy from the saturable reactor SL1 in the capacitor C3. Then, if the saturable reactor SL1 and the reactor L3 terminate releasing respective energies, the charging of the capacitor C3 is stopped.

Next, during a period between time t20 and time t3, energy stored in the capacitor C3 flows in a path: C3→Q2→SL1(5a)→C3, thereby resetting the magnetic fluxes of the saturable reactor SL1. Likewise, the magnetic fluxes vary in the transformer T to which the saturable reactor SL1 is connected in parallel.

In this moment, since during the period between time t20 and time t3 energy stored in the capacitor C3 is fed back to the saturable SL1, the current SL1i flowing through the saturable reactor SL1i takes a negative value as shown in FIG. 6. That is, the current SL1i varies from the current value e (zero) at time 20 to a current value f (negative value) at time t2a. On the B-H characteristic curve shown in FIG. 5, the magnetic fluxes vary from Be to Bf. Also, a surface area S defined between time t2 and time t20 equals a surface area S defined between time t20 and time t2a. This surface area S corresponds to energy released from the saturable reactor SL1 and stored in the capacitor C3.

Then, the current SL1i varies from the current value f (negative value) at time t2a to a current value g (negative value) at time t3. On the B-H characteristic curve shown in FIG. 5, the magnetic fluxes vary from Bf to Bg. A surface area defined between time t2a and time t3 corresponds to energy released from the reactor L3 and stored in the capacitor C3.

That is, since energy stored in the capacitor C3 corresponds to an added value of energy of the saturable reactor SL1 and energy of the reactor L3, the current SL1i increases by a component equivalent to energy supplied from the reactor L3 during the resetting of the magnetic fluxes. Thus, the magnetic fluxes shift to the third quadrant and reach to a saturable area (Bf-Bg) whereby the current SL1i increases to mark the maximum level at time t3 (the same at time t1). The current SL1i increases immediately before the on-period of the switch Q2 terminates and indicates a current appearing when the saturable reactor SL1 is saturated.

Further, at time t3, the current Q2i of the switch Q2 is maximized. Turning off the switch Q2 at this time allows the capacitor C1 to rapidly discharge and the current shortly becomes zeroed. Then, the switch Q1 is able to achieve zero-voltage switching.

In such a way, since the switch Q1 performs the zero-voltage switching due to energy stored in the reactor L3 connected to the primary winding 5a of the transformer T, the zero-voltage switching is not completely performed in the presence of less energy in the reactor L3. Also, if energy is excessive, a circulating current increases, resulting in an increase in loss of the switch Q1. For this reason, the reactor L3 need to have an appropriate inductance value.

(Basic Example of Transformer)

Therefore, with the first embodiment, it is featured that the reactor L3 is connected to the primary winding 5a of the transformer T in series in a structure wherein a leakage inductance between the primary winding 5a and the secondary winding 5b of the transformer T is well-suited to allow the resulting leakage inductance to form the reactor L3 without requiring an external reactor for thereby achieving the simplification in a circuitry. That is, as shown in FIGS. 2B and 2C, auxiliary cores 24a and 24b are inserted between the primary winding 5a and the secondary binding 5b of the transformer T and adjusting the number of auxiliary cores and a length L enables a leakage inductance value to be regulated for providing a desired reactor (inductor).

Describing a structure of the transformer T in detail, in FIGS. 2B and 2C the primary winding 5a and the secondary winding 5b are mounted on a central leg 22 of a main core 21 made of magnetic material and having a mirror E-shape, wherein two Es face each other, the top and bottom legs are connected to each other, and the central legs connect to form the central leg 22 with a given spacing 23 between the top and bottom legs. Disposed in the given spacing 23 are auxiliary cores 24a, 24b, spaced from one another in a given distance along a circumferential direction of the primary winding 5a, which are made of two magnetic materials with a given length L. Also, the primary winding 5a and the secondary winding 5b have windings wound with insulation tapes, respectively, though not shown.

Although this example has a structure that is composed of two auxiliary cores, adjusting the number of auxiliary cores and the given length L enables a well-suited leakage inductance value to be obtained. Further, increasing the number of auxiliary cores increases surface areas and increasing the given length L shortens a gap between the main core 21 and the auxiliary cores, resulting in an increase in a leakage inductance. Accordingly, appropriate energy is stored in the leakage inductance and this energy is able to allow the switch Q1 to completely operate in a zero-voltage switching mode.

(Concrete Example 1 of Transformer T)

Figure 7:
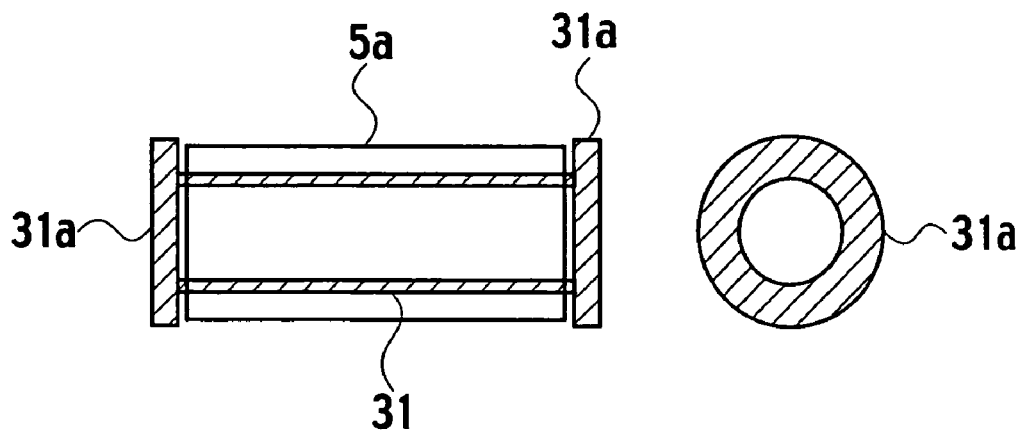
FIG. 7 is a structural view showing a concrete example 1 of an inner bobbin of the transformer.
Figure 8:
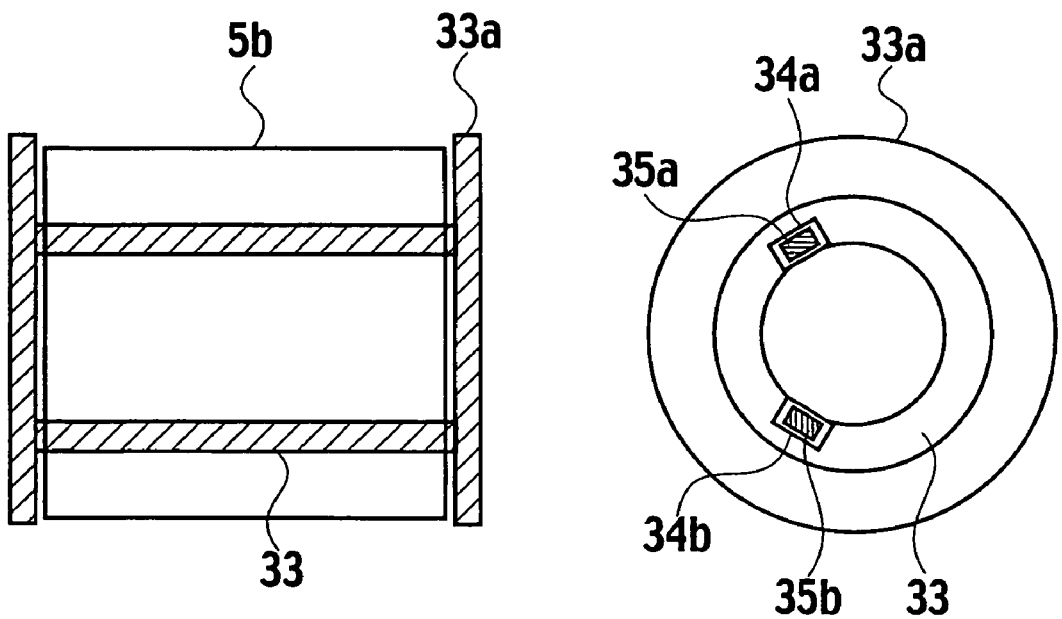
FIG. 8 is a structural view showing a concrete example 1 of an outer bobbin of the transformer.

FIG. 7 is a structural view showing a concrete example 1 of an inner bobbin of the transformer. FIG. 8 is a structural view showing a concrete example 1 of an outer bobbin of the transformer. The transformer of the concrete example 1 is comprised of the main core 21 shown in FIG. 2B, a cylindrical inner bobbin 31 (shown in FIG. 7) on which the primary winding 5a is wound, and an outer bobbin 33 (shown in FIG. 8), formed with slits 34a, 34b each with a given length L along a circumferential direction of the primary winding 5a to which auxiliary cores 35a, 35b are inserted, which is larger in diameter than the first bobbin 31 and on which the secondary winding 5b is wound. The inner bobbin 31 and the outer bobbin 33 are made of resin material.

By adjusting the number of auxiliary cores and the length L, a well-suited leakage inductance value is obtained. Further, for the purpose of precluding the winding from dropping-off, the inner bobbin 31 has both ends formed with stepped portions 31a and, likewise, the outer bobbin 33 has both ends formed with stepped portions 33a.

The transformer T with such a structure is fabricated in a manner described below. First, the slits 34a, 34b are formed in the outer bobbin 33 for mounting the auxiliary cores 35a, 35b and the secondary winding 5b is wound on the outer bobbin 33 on which the auxiliary cores 35a, 35b each adjusted in the given length L are inserted to the slits 34a, 34b.

Then, the primary winding 5a is wound on the inner bobbin 31 and the inner bobbin 21 is inserted to the outer bobbin 33, on which the main core 21 is mounted with the inner bobbin 31 inserted to the outer bobbin 33, thereby completing the transformer T.

Thus, since the transformer T as fabricated above has the reactor L3 with an appropriate inductance value and the insulation between the primary winding 5a and the secondary winding 5b is performed with the bobbin, the transformer T has excellent insulation and less stray capacitance. Also, an electric power supply is enabled to have an increased safety with a reduction in noises. Besides, no insulation tapes are needed for the primary winding 5a and the secondary winding 5b, providing an ease of fabrication.

Concrete Example 2 of Transformer

Figure 9:
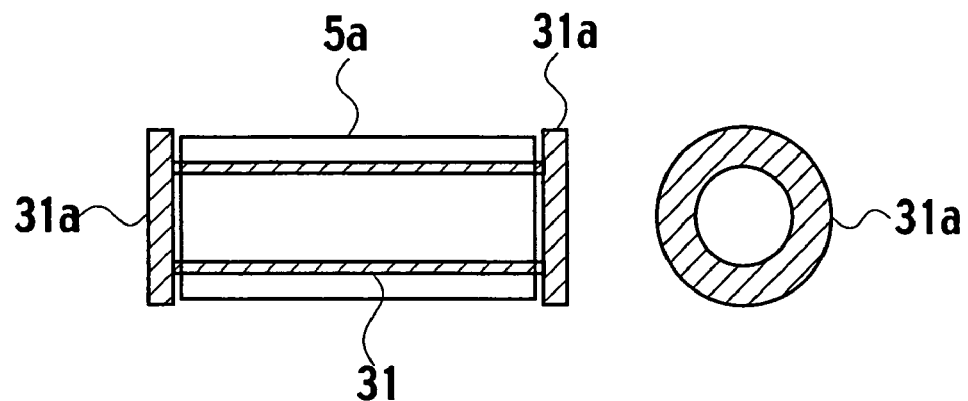
FIG. 9 is a structural view showing a concrete example 2 of an inner bobbin of the transformer.
Figure 10:
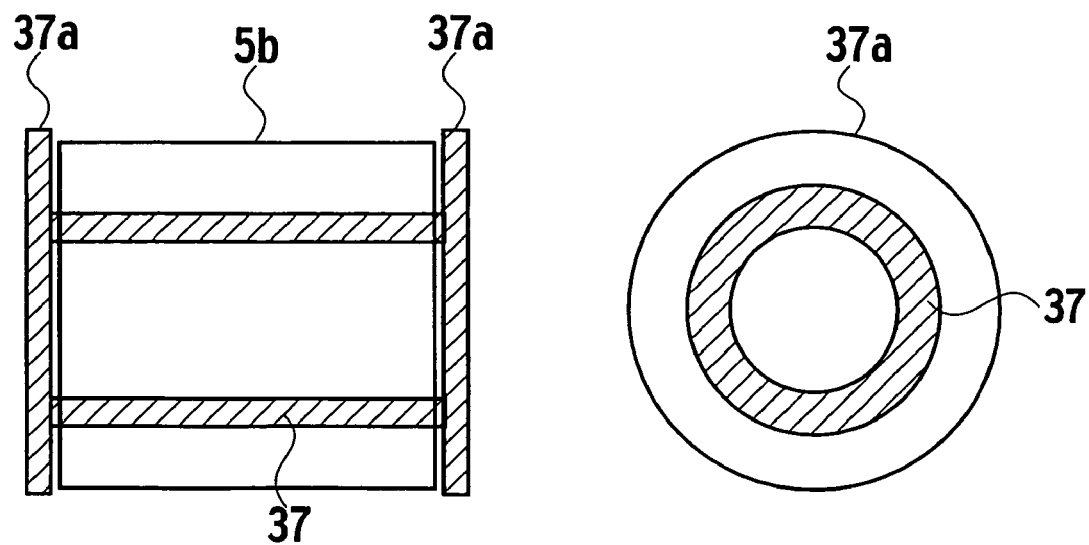
FIG. 10 is a structural view showing a concrete example 2 of an outer bobbin of the transformer.

FIG. 9 is a structural view showing a concrete example 2 of an inner bobbin of the transformer. FIG. 10 is a structural view showing a concrete example 2 of an outer bobbin of the transformer. The transformer of the concrete example 2 is comprised of the main core 21 shown in FIG. 2B, the cylindrical inner bobbin 31 (shown in FIG. 9) on which the primary winding 5a is wound, and an outer bobbin 37 (shown in FIG. 10), larger in diameter than the first bobbin 31 and wound with the secondary winding 5b, which is made of insulating magnetic material such as plastic magnet material. The magnetic material may include ferrite and Permalloy.

By adjusting a magnetic permeability of insulation magnetic material, a well-suited leakage inductance value is obtained. Further, for the purpose of precluding the winding from dropping-off, the inner bobbin 31 has both ends formed with the stepped portions 31a and, likewise, the outer bobbin 37 has both ends formed with stepped portions 37a.

The transformer T with such a concrete example 2 has no use of the auxiliary cores, thereby enabling a transformer in a further simplified form.

EMBODIMENT 2

Next, a switching power supply of a second embodiment is described below. The switching power supply of the second embodiment features that a feedback winding is located on a secondary side (output side) of a transformer to increase an inductance value of a reactor connected to a primary winding of a transformer and to cause energy, stored in the reactor when the switch Q1 is turned on, to be fed back to the secondary (output side) side.

Figure 11:
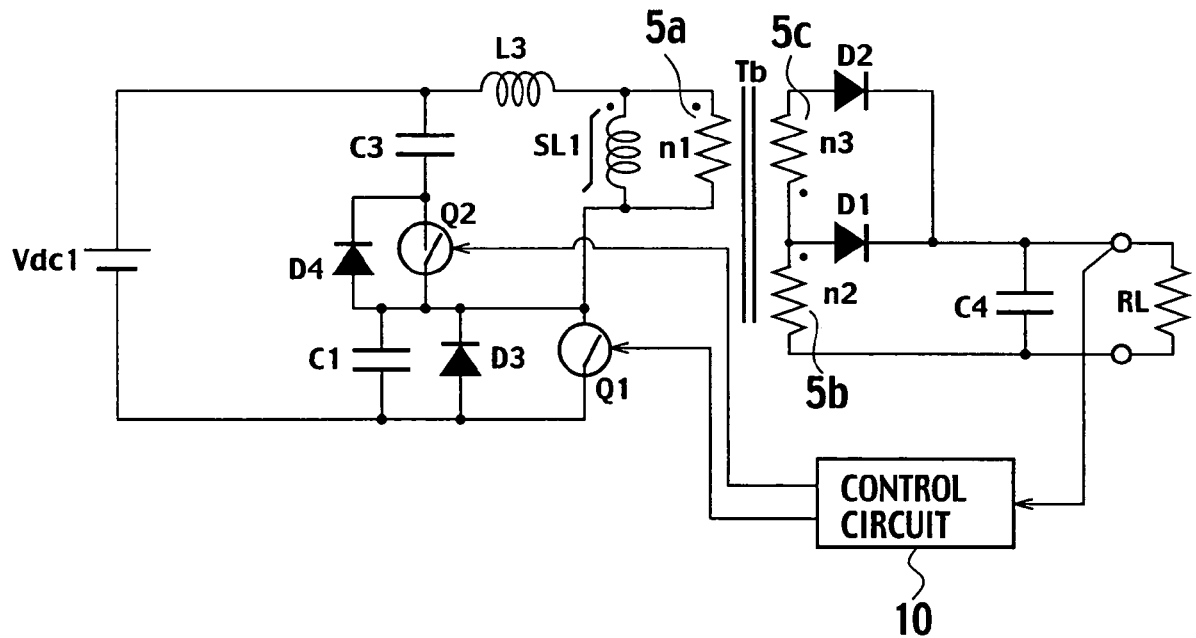
FIG. 11 is a circuit structural view showing a switching power supply of a second embodiment.

FIG. 11 is a circuit structural view of the switching power supply of the second embodiment. Since the switching power supply of the second embodiment, shown in FIG. 11, differs from the switching power supply of the first embodiment, shown in FIGS. 2A, 2B and 2C, in respect of a transformer Tb and associated peripheral circuitries of the transformer Tb, only related parts are described.

In this example, the primary winding 5a (with the winding number n1), the secondary winding (with the winding number n2), and a feedback winding 5c (with the winding number n3) are wound on the transformer Tb. The primary winding 5a and the secondary winding 5b are wound in the same phase and the primary winding 5a and the feedback winding 5c are wound in an opposite phase. That is, the secondary winding 5b of the transformer Tb is loosely coupled to the secondary winding 5a to cause a leakage inductance between the primary winding 5a and the secondary winding 5b to form a reactor L3 connected to the transformer Tb in series. Thus, energy, stored in the reactor L3 when the switch Q1 is turned on, is fed back to the secondary side when the switch Q1 is turned.

One end (on a side ●) of the secondary winding 5b and one end (on a side ●) of the feedback winding 5c are connected at a junction to which an anode of the diode D1 is connected. The other end (on a side absent of ●) of the feedback winding 5c is connected to an anode of the diode D2, and the cathodes of the diode D1 and the diode D2 are connected to one end of the capacitor C4. The other end of the capacitor C4 is connected to the other end of the secondary winding 5b (on a side absent of ●).

Next, operations of the switching power supply of the second embodiment with such a structure are described with reference to a timing chart shown in FIG. 13. Also, FIG. 13 shows a voltage Q1v developed at the both terminals of the switch Q1, a current Q1i flowing through the switch Q1, a current Q2i flowing through the switch Q2, a current SL1i flowing through the saturable reactor SL1, and currents D1i, D2i flowing through the diodes D1, D2.

First, if the switch Q1 is turned on at time t1, a current flows in a path: Vdc1→L3→5a(SL1)→Q1→Vdc1. Further, at this time, a voltage is developed across the second winding 5b of the transformer Tb to cause a current to flow in a path: 5b→D1→C4→5b. For this reason, as shown in FIG. 13, a current D1i of the diode D1 linearly increases during a period from time t1 to time t2.

Next, if the switch Q1 is turned off at time t2, energy stored in the reactor L3 is circulated to the secondary side of the transformer Tb. That is, since a voltage is induced in the feedback winding 5c on the secondary side of the transformer Tb, a current flows in a path: 5c→D2→C4→5b→5c. Therefore, as shown in FIG. 13, a current D2i flows through the diode D2 during a period between times t2 to t3.

Thus, with the switching power supply of the second embodiment, an inductance value of the reactor L3 connected to the primary winding 5a of the transformer Tb in series is set to an increased value, and energy, stored in the reactor L3 when the switch Q1 is turned on, is circulated to the secondary side of the transformer, providing an improved efficiency. Also, due to the diode D1 and the diode D2, a secondary current continuously flows during periods when the switch Q1 is turned on or turned off. Thus, a ripple current of the capacitor C4 decreases.

Figure 12:
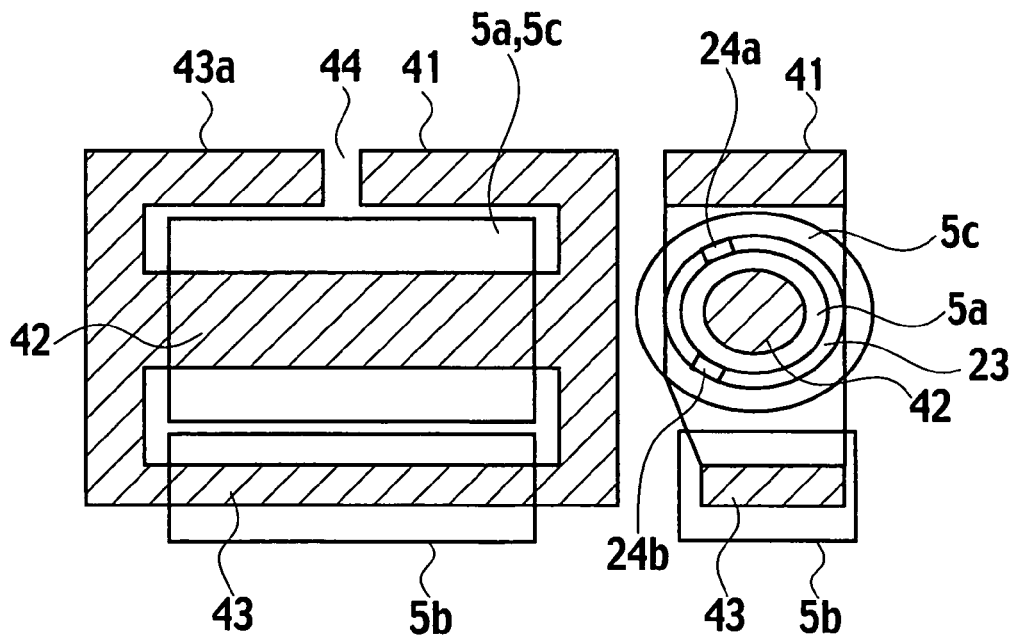
FIG. 12 is a structural view showing a transformer incorporated in the switching power supply of the second embodiment

FIG. 12 is a structural view showing the transformer for use in the switching power supply of the second embodiment. The transformer Tb shown in FIG. 12 includes a main core 41, formed in a mirror E-shape configuration, wherein two Es face each other, the bottom legs are connected to each other, and the central legs connect to form a central leg 42 on which the primary winding 5a and the feedback winding 5c are mounted with a given gap 23 between the top and bottom legs and the central leg 42. Disposed in the given gap 23 are auxiliary cores 24a, 24b, made of two magnetic materials each with a given length L, which are spaced from each other with a given distance along a circumferential direction of the primary winding 5a. Also, the primary winding 5a and the feedback winding 5c have respective windings on which insulation tapes are wound, respectively, through not shown.

In this example, there are two auxiliary cores. However, adjusting the number of auxiliary cores and the given length L allows a well-suited leakage inductance value to be obtained between the primary winding 5a and the feedback winding 5c.

Further, formed in the main core 41 are a pass core 43a and a gap 44, and the secondary winding 5b is wound on a side core 43. That is, the primary winding 5a is loosely coupled to the secondary winding 5b by the pass core 43a, resulting in an increase in a leakage inductance.

Thus, devising a shape of the core of the transformer Tb and the windings allows the primary winding 5a, the secondary winding 5b, and the feedback winding 5c to be coupled to a single main core 41 and providing the pass core 43a enables an increased leakage inductance to be obtained to form the reactor L3. Thus, coupling the transformer section to the reactor enables the power switching supply to be miniaturized at low costs.

Further, locating a plurality of auxiliary cores in the gap 23 between the primary winding 5a and the feedback winding 5c and adjusting the number of auxiliary cores and the given length L enables a leakage inductance to be adjusted to a well-suited value. Accordingly, the switching power supply of the second embodiment has the same effects as those of the switching power supply of the first embodiment.

Also, while the switching power supply of the second embodiment forms a structure in which the auxiliary cores 24a, 24b are located in the gaps 23 between the primary winding 5a and the feedback winding 5c, using the inner bobbin 31 shown in FIG. 7 and the outer bobbin shown in FIG. 8 may allow the primary winding 5a on the inner bobbin 31 to be mounted on the inner bobbin 31 and the feedback winding 5c to be wound on the outer bobbin 37 such that the inner bobbin 31 is mounted to the central leg 42 of the main core 41 under a condition where the inner bobbin 31 is inserted to the outer bobbin 37.

Further, using the inner bobbin 31 shown in FIG. 9 and the outer bobbin 37 shown in FIG. 10 may allow the primary winding 5a to be wound on the inner bobbin 31 and the feedback winding 5c to be wound on the outer bobbin 37 such that the inner bobbin 31 is mounted to the central leg 42 of the main core 41 under conditions where the inner bobbin 31 is inserted to the outer bobbin 37.

INDUSTRIAL APPLICABILITY

According to the present invention, by setting a leakage inductance of the transformer to a well-suited value, no external reactor is needed and zero-voltage switching is made operative, thereby enabling to provide a switching power supply with high efficiency, low size, and low noises.

Therefore, the switching power supply of the present invention is applicable to a DC-DC conversion type power supply circuit and an AC-DC type conversion type power supply circuit.

The invention claimed is:

1. A switching power supply comprising:
a first series circuit, connected to both terminals of a direct current power supply, in which a primary winding of a transformer, a reactor, and a first switch are connected in series;
a second series circuit, connected to one of both terminals of the first switch and both terminals of the primary winding and the reactor, in which a second switch and a capacitor are connected in series;
a smoothing circuit smoothing a voltage developed across a secondary winding of the transformer; and
a control circuit alternately turning on and turning off the first and second switches,
wherein the transformer, formed with a magnetic circuit includes:
a main core, made of magnetic material, in which the secondary winding is lap-wound on the primary winding with a given gap; and
a plurality of auxiliary cores, made of magnetic material, which are disposed in the given gap with a given distance in a circumferential direction of the primary winding,
wherein the reactor is formed of a leakage inductance of the transformer, the leakage inductance having a value set by adjusting a number of the auxiliary cores or a length of the auxiliary cores, and
wherein the plurality of auxiliary cores are provided on the transformer to leak a part of a magnetic flux generated by the main core.

2. The switching power supply according to claim 1, wherein the transformer includes: a cylindrical inner bobbin on which the primary winding is wound; and an outer bobbin having a diameter larger than that of the inner bobbin on which the secondary winding is wound, and having a plurality of slits, formed in a given distance along the circumferential direction, which accommodate the plurality of auxiliary cores, respectively, and
wherein the inner bobbin is mounted to the main core under a condition where the inner bobbin is inserted to the outer bobbin.

3. A switching power supply comprising:
a first series circuit, connected to both terminals of a direct current power supply, in which a primary winding of a transformer, a reactor, and a first switch are connected in series;
a second series circuit, connected to one of both terminals of the first switch and both terminals of the primary winding and the reactor, in which a second switch and a capacitor are connected in series;
a smoothing circuit smoothing a voltage developed across a secondary winding of the transformer; and
a control circuit alternately turning on and turning off the first and second switches,
wherein the transformer, formed with a magnetic circuit, includes a main core, made of magnetic material, that has:
a cylindrical inner bobbin on which the primary winding is wound; and
an outer bobbin having a diameter larger than that of the inner bobbin, on which the secondary winding is wound, the outer bobbin being made of an insulating magnetic material, and
wherein the inner bobbin is mounted to the main core under a condition where the inner bobbin is inserted to the outer bobbin thereby the secondary winding is lap-wound on the primary winding via the insulating magnetic material, wherein the reactor is formed of a leakage inductance of the transformer, the leakage inductance having a value set by adjusting a magnetic permeability of the insulting magnetic material, and wherein the insulating magnetic material is provided on the transformer to leak a part of a magnetic flux generated by the main core.

4. A switching power supply comprising:

a first series circuit, connected to both terminals of a direct current power supply, in which a primary winding of a transformer, a reactor, and a first switch are connected in series;

a second series circuit, connected to one of both terminals of the first switch and both terminals of the primary winding and the reactor, in which a second switch and a capacitor are connected in series;

a smoothing circuit smoothing a voltage developed across a secondary winding of the transformer;

a control circuit alternately turning on and turning off the first and second switches; and a feedback winding, located on a secondary side of the transformer, which allows energy stored in the reactor when the first switch is turned on to be circulated to the secondary side when the first switch is turned off, wherein the transformer, formed with a magnetic circuit, including:

a main core, made of magnetic material and formed with a mirror E-shape, that has:
 a central leg on which the primary winding of the transformer is wound, the feedback winding being lap-wound on the primary winding with a first given gap;
 a first side core formed with a second given gap, and
 a second side core on which the secondary winding of the transformer is wound; and
 a plurality of auxiliary cores, made of magnetic material, which are disposed in the first given gap with a given distance in a circumferential direction of the primary winding, wherein the reactor is formed of a leakage inductance of the transformer, the leakage inductance having a value set by adjusting a number of the auxiliary cores or a length of the auxiliary cores, and wherein the plurality of auxiliary cores are provided on the transformer to leak a part of a magnetic flux generated by the main core.

5. The switching power supply according to claim 4, wherein the transformer includes; a cylindrical inner bobbin on which the primary winding is wound; and an outer bobbin having a diameter larger than that of the inner bobbin on which the feedback winding is wound, and having a plurality of slits, formed in a given distance in the circumferential direction, which accommodate the plurality of auxiliary cores, respectively, and wherein the inner bobbin is mounted to the central leg of the main core under a condition where the inner bobbin is inserted to the outer bobbin.

6. A switching power supply comprising:

a first series circuit, connected to both terminals of a direct current power supply, in which a primary winding of a transformer, a reactor, and a first switch are connected in series;

a second series circuit, connected to one of both terminals of the first switch and both terminals of the primary winding and the reactor, in which a second switch and a capacitor are connected in series;

a smoothing circuit smoothing a voltage developed across a secondary winding of the transformer;

a control circuit alternately turning on and turning off of the first and second switches; and a feedback winding, located on a secondary side of the transformer, which allows energy stored in the reactor when the first switch is turned on to be circulated to the secondary side when the first switch is turned off, wherein the transformer, formed with a magnetic circuit includes a main core, made of magnetic material and formed with a mirror E-shape, that has:

a central leg mounted with a cylindrical inner bobbin on which the primary winding is wound and an outer bobbin, having a diameter larger than that of the inner bobbin, on which the feedback winding is wound, the outer bobbin being made of an insulating magnetic material, and wherein the inner bobbin is mounted to the central leg of the main core under a condition where the inner bobbin is inserted to the outer bobbin thereby the feedback winding is lap-wound on the primary winding via the insulating magnetic material, a first side core formed with a given gap, and a second side core on which the secondary winding of the transformer is wound;

wherein the reactor is formed of a leakage inductance of the transformer, the leakage inductance having a value set by adjusting a magnetic permeability of the insulting magnetic material; and wherein the insulating magnetic material is provided on the transformer to leak a part of a magnetic flux generated by the main core.

7. The switching power supply according to claim 1, further comprising:

a saturable reactor connected to both terminals of the primary winding of the transformer to utilize a saturable characteristic of the core of the transformer, wherein the control circuit turns off the second switch when a current of the second switch increases.

8. The switching power supply according to claim 2, further comprising:

a saturable reactor connected to both terminals of the primary winding of the transformer to utilize a saturable characteristic of the core of the transformer, wherein the control circuit turns off the second switch when a current of the second switch increases.

9. The switching power supply according to claim 3, further comprising:

a saturable reactor connected to both terminals of the primary winding of the transformer to utilize a saturable characteristic of the core of the transformer, wherein the control circuit turns off the second switch when a current of the second switch increases.

10. The switching power supply according to claim 4, further comprising:

a saturable reactor connected to both terminals of the primary winding of the transformer to utilize a saturable characteristic of the core of the transformer, wherein the control circuit turns off the second switch when a current of the second switch increases.

11. The switching power supply according to claim 5, further comprising:

a saturable reactor connected to both terminals of the primary winding of the transformer to utilize a saturable characteristic of the core of the transformer,
wherein the control circuit turns off the second switch when a current of the second switch increases.

12. The switching power supply according to claim 6, further comprising:

a saturable reactor connected to both terminals of the primary winding of the transformer to utilize a saturable characteristic of the core of the transformer,
wherein the control circuit turns off the second switch when a current of the second switch increases.

* * * * *